(12) United States Patent
Richardson et al.

(10) Patent No.: US 8,986,582 B2
(45) Date of Patent: Mar. 24, 2015

(54) COMPARTMENTALIZED PELLET FOR IMPROVED CONTAMINANT REMOVAL

(71) Applicant: M & G USA Corporation, Apple Grove, WV (US)

(72) Inventors: Delane Nagel Richardson, Medina, OH (US); Edwin A. Sisson, Medina, OH (US); Rebecca Spooner Korwin, Copley, OH (US)

(73) Assignee: M & G USA Corporation, Apple Grove, WV (US)

( * ) Notice: Subject to any disclaimer, the term of this patent is extended or adjusted under 35 U.S.C. 154(b) by 0 days.

(21) Appl. No.: 14/251,683

(22) Filed: Apr. 14, 2014

(65) Prior Publication Data

US 2014/0217637 A1    Aug. 7, 2014

Related U.S. Application Data

(63) Continuation of application No. 13/035,748, filed on Feb. 25, 2011, now Pat. No. 8,696,960.

(51) Int. Cl.
| | |
|---|---|
| *B29B 9/06* | (2006.01) |
| *B29C 47/06* | (2006.01) |
| *B29B 9/12* | (2006.01) |
| *B29B 9/16* | (2006.01) |
| *B29B 17/00* | (2006.01) |
| *B29C 47/00* | (2006.01) |
| *C08J 3/12* | (2006.01) |
| *C08J 11/04* | (2006.01) |
| *C08J 11/06* | (2006.01) |
| *B29K 67/00* | (2006.01) |
| *B29K 105/26* | (2006.01) |

(52) U.S. Cl.
CPC . *B29C 47/06* (2013.01); *B29B 9/12* (2013.01); *B29B 9/16* (2013.01); *B29B 17/0042* (2013.01); *B29C 47/0016* (2013.01); *B29C 47/0021* (2013.01); *C08J 3/12* (2013.01); *C08J 11/04* (2013.01); *C08J 11/06* (2013.01); *C08J 3/126* (2013.01); *B29B 2009/168* (2013.01); *B29C 47/00* (2013.01); *B29K 2067/00* (2013.01); *B29K 2105/26* (2013.01); *C08J 2367/02* (2013.01); *Y10S 264/92* (2013.01); *C08J 2323/06* (2013.01)
USPC .......................................... 264/143; 264/920

(58) Field of Classification Search
USPC ......................................................... 264/143
See application file for complete search history.

(56) References Cited

U.S. PATENT DOCUMENTS

| | | |
|---|---|---|
| 4,791,965 A | 12/1988 | Wynn |
| 5,221,580 A | 6/1993 | Amory et al. |
| 5,340,884 A | 8/1994 | Mills et al. |
| 5,464,676 A | 11/1995 | Hoyt |
| 5,554,657 A | 9/1996 | Brownscombe et al. |

(Continued)

FOREIGN PATENT DOCUMENTS

EP    1236790 A1    9/2002

*Primary Examiner* — Larry Thrower
(74) *Attorney, Agent, or Firm* — Edwin A. Sisson, Attorney at Law, LLC

(57) ABSTRACT

This invention is to an improved method for cleaning contaminated polymer when that polymer is to be blended with clean material. The method involves combining the contaminated material and the clean material in a compartmentalized pellet wherein the contaminated material is placed in the outermost compartment, the clean material is placed in an inner compartment and then subjecting the pellet to an extraction process.

9 Claims, 2 Drawing Sheets

(56) References Cited

U.S. PATENT DOCUMENTS

| | | |
|---|---|---|
| 5,582,913 A | 12/1996 | Simons |
| 5,627,218 A | 5/1997 | Bradt |
| 5,747,548 A | 5/1998 | Bradt |
| 5,780,520 A | 7/1998 | Reeves et al. |
| 5,876,644 A | 3/1999 | Nichols et al. |
| 6,344,539 B1 | 2/2002 | Palmer |
| 6,406,766 B1 | 6/2002 | Rotter et al. |
| 6,436,322 B1 | 8/2002 | Fredl |
| 6,669,986 B1 | 12/2003 | Mushiake et al. |
| 7,550,203 B2 * | 6/2009 | Ferrari et al. .............. 428/403 |

* cited by examiner

US 8,986,582 B2

COMPARTMENTALIZED PELLET FOR IMPROVED CONTAMINANT REMOVAL

PRIORITY AND CROSS REFERENCES

This patent application is a continuation of United States Non-Provisional patent application Ser. No. 13/035,748, filed on 25 Feb. 2011 which is a divisional application of United States Non-Provisional patent application Ser. No. 11/333,693, filed on 17 Jan. 2006 and patented as U.S. Pat. No. 7,931,968 on 26 Apr. 2011. This patent application claims the benefit of the priority of U.S. Provisional Patent Application Ser. No. 60/644,613 filed Jan. 18, 2005; U.S. Provisional Patent Application Ser. No. 60/646,329 filed Jan. 24, 2005; U.S. Provisional Patent Application Ser. No. 60/677,829 filed May 5, 2005; U.S. Provisional Patent Application Ser. No. 60/731,775 filed Oct. 31, 2005, and U.S. Provisional Patent Application Ser. No. 60/644,622 filed Jan. 18, 2005. The teachings of these applications are incorporated herein by reference in their entirety.

BACKGROUND OF THE INVENTION

1. Field of the Invention

This invention generally relates to a multicomponent compartmentalized pellet to increase the efficiency of contaminant removal, such as the contaminants found in post consumer recycled polyester.

2. Related Art

Postconsumer processing of recycled polyethylene terephthalate (RPET) to manufacture a variety of useful consumer products such as flower pots and fence posts is well-known. Typically, the recycling process utilizes used polyester (PET) containers, primarily polyethylene terephthalate, such as discarded carbonated beverage containers, which are collected, sorted, washed, and separated from contaminants to yield a relatively clean source of RPET. Additionally, the manufacture of imperfect and damaged molded PET products, particularly the blow molded bottles for use in containing consumer goods, results in a considerable amount of PET waste which the manufacturers of such products would like to reuse. The RPET produced by conventional recycling processes is generally in ground or flake form, which is thereafter melt processed or further pelletized by the end user.

RPET is always subjected to a grinding operation in order to make the material easier to handle and process. Conventional grinding equipment reduces the RPET to about ⅜ inch particles or flakes. The grinding is conducted in a manner to insure that a consistent flake size will be produced, by employing a grate or screen through which the ground material must pass upon exiting the grinder. Although conventional RPET flakes melt processing and pelletizing equipment is designed to handle ⅜ inch flakes, some RPET materials having sizes as large as ½ inch and as small as ¼ inch are also commercially produced. The bulk density of ⅜ inch flake RPET generally ranges from about 22 to about 35 pounds per cubic foot.

Similarly, RPET and PET pellets are generally formed to a standard, uniform size about 0.12 inch in diameter. The bulk density of such pellets generally ranges from about 50 to about 58 pounds per cubic foot. Typically, PET and RPET melt processing equipment is designed to accept pellets having the above mentioned dimensions and physical characteristics.

The critical aspect for achieving consistently high quality end products utilizing RPET is comprehensive decontamination of the RPET flakes or pellets. Significant decontamination occurs during the washing and sorting of PET scrap. The incoming PET bottles and containers are comminuted to form PET fragments and to remove loose labels, dirt, and other adhered foreign particles. Thereafter, the mixture is air classified and the remaining fragments are washed in a hot detergent solution to remove additional label fragments and adhesives from the PET fragments. The washed PET fragments are then rinsed and placed in a series of flotation baths where heavier and lighter weight foreign particles are removed. The remaining PET fragments are then dried and sold as RPET flakes. Thus, label and basecup glues, polyolefins, PVC, paper, glass, and metals, all of which adversely affect the quality and performance of the finished product, are removed from the RPET.

Of recent concern are the toxic contaminants which may be introduced into a typical RPET processing stream. Examples of such contaminants include pesticides, solvents, herbicides, and chlorinated hydrocarbons which could contaminate the RPET through incidental, inadvertent contact during processing or transporting same, or by the recycling of PET bottles and containers which were used by consumers to hold toxic substances for some extended period of time.

With regard to the possibility that toxic contaminants could be contained in RPET designed for food-contact use, the U.S. FDA has set protocols for the levels of such contaminants in these applications, and has established surrogate and concentration limits to establish the effectiveness of washing and subsequent decontamination processes. Because the U.S. FDA protocols require that the selected contaminants be within the RPET matrix, the contaminant is either extruded in the melt of the RPET or introduced into the RPET by exposed it to the selected contaminant for as long as two weeks. The contaminants then diffuse into the polymer matrix of a bottle or container sidewall that is subsequently recycled. Accordingly, an effective decontamination method will to some extent require that the contaminant be driven back out of the RPET flakes produced from the bottle or container sidewalls, in order to meet the required contaminant concentration limit.

Many processes exist to purify the RPET so that it is suitable to for re-use in food packaging. In general, these processes can be categorized as depolymerization to raw materials, depolymerization to low molecular weight oligomers, and medium to high molecular weight extraction. U.S. Pat. No. 6,545,061 is an example of depolymerization to raw materials and describes a polyethylene terephthalate depolymerization and purification process comprising: a) conducting acetolysis on recyclable polyethylene terephthalate to form terephthalic acid and ethylene glycol diacetate; reacting said terephthalic acid with methanol to form dimethyl terephthalate; and reacting said dimethyl terephthalate with said ethylene glycol diacetate under transesterification and polycondensation conditions to form a polyethylene terephthalate product, said polyethylene terephthalate product having units of diethylene glycol at a concentration of less than about 1.5 weight percent, based on the total weight of said polyethylene terephthalate product. U.S. Pat. No. 6,410,607 is an example of depolymerization to low molecular weight oligomers and describes a depolymerization and purification process comprising: contacting a contaminated polyester with an amount of a glycol to provide a molar ratio of greater than about 1 to about 5 total glycol units to total dicarboxylic acid units at a temperature between about 150 to about 300° C. and an absolute pressure of about 0.5 to about 3 bars under agitation in a reactor for a time sufficient to produce, in the reactor, an upper layer comprising a relatively low density contaminant floating above a lower layer including a liquid comprising a depolymerized oligomer of said polyester; and separating, while under said agitation, said upper layer from said lower layer by removing said upper layer from the reactor in a first stream and removing said lower layer from the reactor in a second stream. The inherent deficiency with the depolymerization processes is the capital operating costs. In all cases, the resulting product must be re-polymerized in the expensive melt phase in order to be used again. Therefore, the need exists to provide a high efficiency purification technique without depolymerizing the polymer.

U.S. Pat. No. 5,876,644 is an example of depolymerizing the polymer to a medium level molecular weight and discloses a method of recycling postconsumer polyester to obtain recycled polyester of sufficiently high purity to meet food packaging requirements. The method includes cleaning comminuted pieces of postconsumer polyester to remove surface contaminants; melting the surface-cleaned postconsumer polyester pieces; extruding the postconsumer melt; blending the melt of postconsumer polyester with a melt of virgin polyester prepolymer; solidifying and pelletizing the blended melt while the virgin polyester prepolymer remains as prepolymer; and polymerizing the solid blended pellets in the solid state. While this particular process avoids the melt polymerization step it is inefficient because it blends the postconsumer polyester with a melt of virgin polyester prepolymer. This blending creates a single pellet of a homogenous dispersion of the contaminated material throughout the pellet. Since the solid state or solid phase polymerization is a diffusion limited extraction process, the contaminants located on the inner part of the pellet will not sufficiently migrate to be removed. This deficiency limits either the amount of the contaminant in the postconsumer polyester or the amount of contaminated polyester material in the pellet.

U.S. Pat. Nos. 5,899,392 and 5,824,196 are examples of high molecular weight extraction. To keep the polymer within reasonable molecular weights the high molecular weight extractions can only expose the material to the extraction step for a limited amount of time or the polymer will build molecular weight beyond the practical bounds. U.S. Pat. No. 5,899,392 attempts to overcome this limitation and the diffusion limitation of the prior art by reducing the particle size to minimize the diffusion path and increase the surface area. U.S. Pat. No. 5,899,392 claims a process for removing a contaminant which has penetrated into the matrices of RPET flakes from the RPET flakes, comprising the steps of comminuting the RPET flakes, to prepare particles having an average mean particle size from about 0.005 inch to about 0.1 inch in diameter; and driving the contaminant out of the RPET particles by causing the contaminant to diffuse out at the surfaces of the RPET particles. The deficiency of the reduced size is that the small particles must generally be re-extruded into manageable pellet size and either melt blended or dry blended with the virgin uncontaminated PET.

It would be desirable to develop a process for decontaminating RPET to produce "clean" RPET, wherein the clean RPET would exhibit a residual contaminant level which would make it acceptable for manufacturing new food-grade PET bottles and containers, but do so without the additional process steps of fine grinding or re-polymerizing.

SUMMARY OF THE INVENTION

This invention discloses a compartmentalized pellet comprising at least two compartments wherein the first compartment with the largest surface area contacting air comprises contaminated thermoplastic polymer and second compartment comprises uncontaminated thermoplastic polymer. Further disclosed is that the contaminated thermoplastic polymer may be selected from the group consisting of recycled polyethylene terephthalate and copolymers of recycled polyethylene terephthalate and the uncontaminated thermoplastic polymer may be selected from the group consisting of virgin polyethylene terephthalate and copolymers of recycled polyethylene terephthalate.

Also disclosed is a method of recycling postconsumer polyester to obtain recycled polyester comprising the steps of:
  cleaning comminuted pieces of postconsumer polyester to remove surface contaminants therefrom thereby producing surface cleaned postconsumer polyester pieces;
  melting the surface-cleaned postconsumer polyester pieces to produce a postconsumer polyester melt;
  extruding the postconsumer polyester melt to reduce the intrinsic viscosity of the postconsumer polyester melt and remove additional contaminants;
  forming a compartmentalized strand comprised of at least two compartments comprised of the postconsumer polyester melt and a virgin polyester melt wherein the outer compartment next to the air is comprised of the postconsumer polyester melt and the inner compartment is comprised of the virgin polyester melt;
  solidifying and pelletizing the compartmentalized strand to make solid
  compartmentalized pellets; and
  extracting contaminants from the solid compartmentalized pellets.

It is further disclosed that the postconsumer polyester is less than 35 weight percent of the compartmentalized pellet. It is also further disclosed that the extraction step comprises maintaining the compartmentalized pellets in a temperature range of 150° C. and 1° C. less than the melt point of the pellet and removing the contaminants from the surface of the pellet.

It is also disclosed that the step of removing the contaminants from the surface comprises maintaining the pellets in an evacuating vacuum environment, passing a vapor over the pellets, passing a non-reactor vapor over the pellets, or passing an inert or mixture of inert gases over the pellets.

It is further disclosed that the extraction step comprises exposing the compartmentalized pellets to a liquid which removes at least one contaminant and that the liquid may solubilized polyamide and that the liquid may be formic acid or ethylene glycol.

DETAILED DESCRIPTION OF THE INVENTION

The following embodiment demonstrates how the compartmentalized structure improves upon the prior art.

U.S. Pat. Nos. 5,627,218 and 5,747,548, the teachings of which are incorporated in their entirety, teach many techniques for manufacturing compartmentalized pellets. In one embodiment, there are at least two zones, or regions in the pellet, preferably a core and a sheath. In this, and all subsequent embodiments, the core-sheath with the sealed ends, as taught by U.S. Pat. No. 6,669,986, the teachings of which are incorporated in their entirety, is the preferred pellet structure.

Figure 1:
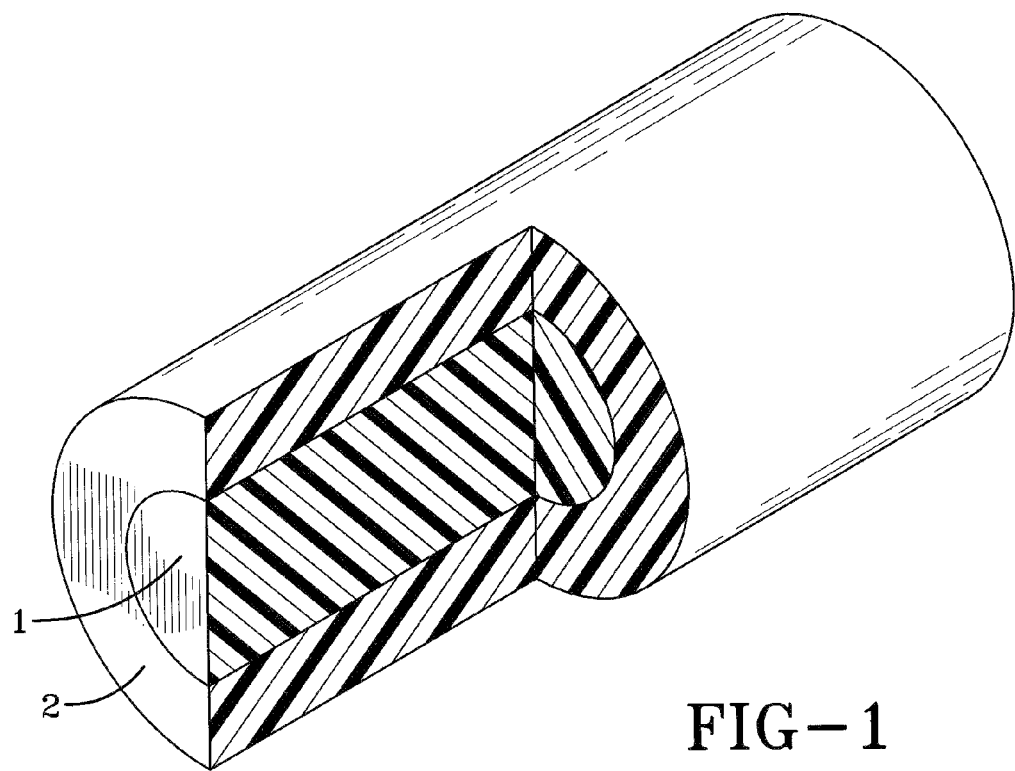
FIG. 1 depicts a resin pellet with two compartments or zones in the core-sheath configuration.

The core-sheath structure is obtained using two extruders. If a third annular ring is desired, an additional extruder is required. The first extruder supplies the liquid feed forming the core material which is linearly extruded at the center of the strand. At the same time, the sheath material is extruded in the second extruder into the sheath layer which concentrically covers the core. U.S. Pat. No. 6,669,986 discloses a multiple hole die apparatus to manufacture a core-sheath pellet. FIG. 1 shows the core-sheath multilayer strand. Element 1 is the core and element 2 is the sheath.

Figure 2:
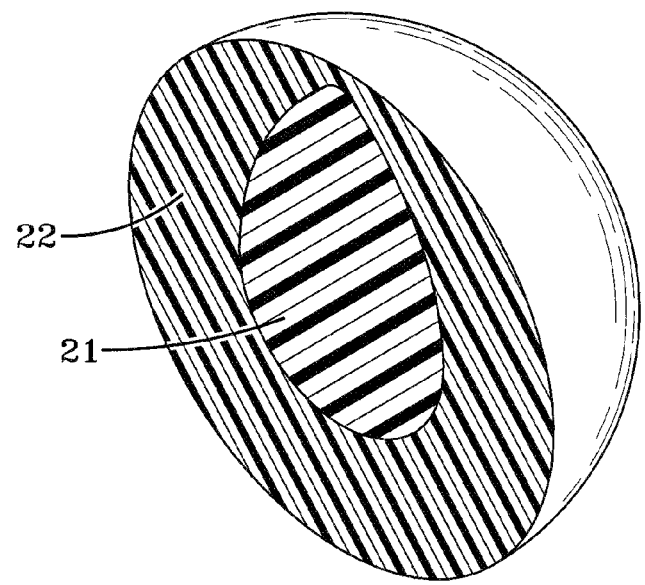
FIG. 2 depicts a resin pellet with two compartments or zones in the core-sheath configuration where the core is encapsulated, surrounded, or enclosed by an outer sheath layer.

Another preferred embodiment is to close the ends of the chip so the higher melt viscosity polymer is completely surrounded and enclosed by the low melt viscosity polymer in the sheath. This preferred embodiment is depicted in FIG. 2, closes the ends of the pellet so that the inner core, labeled 21, is completely surrounded and enclosed by the sheath, labeled 22. This structure exposes more surface area and increases the extraction efficiency even more. U.S. Pat. No. 6,669,986 teaches that spherical or elliptical or disk-form multilayer chips with the overall circumference including the end face of the core material coated with sheath material can be made by rounding the cut end face. One way to make a chip with an outer layer sheath that encloses the contents of the inner layers is made by cutting the chip strand next to the die underwater.

Figure 4:
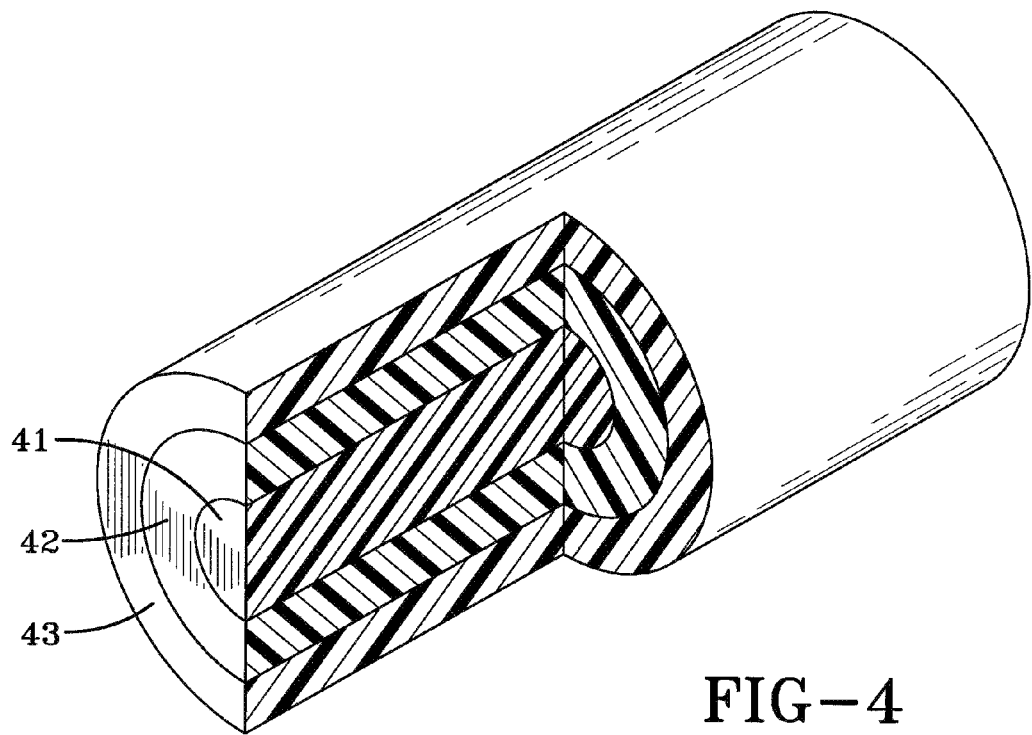
FIG. 4 depicts a resin pellet of three compartmentalized zones configured in two concentric layers surrounding a core.

It is apparent to one skilled in the art that the strand could consist of more than two annular concentric layers. This would be accomplished by using another feeder and a different die. FIG. 4 depicts this chip having 3 compartmentalized zones having a core 41 which is comprised of the clean material wherein the core is encased by an intermediate layer 42 which is comprised of a clean or contaminated material, which is in turn surrounded by an outer layer 43 which is comprised of the contaminated material.

The first step is to extrusion form a multilayer strand. One component is extruded in the center of the pellet and the other component is extruded around the center component. The extrusion-formed multilayer strand is cut by a pelletizer before or after it is cooled as required and formed into multilayer pellets.

For cooling, a general cooling means is adopted. For example, a method for immersing the multilayer strand into cooling water in the water tank is adopted. The water-cooled multilayer strand is preferably sent to the pelletizer after moisture adhering to the surface removed by a water dripping device.

The pelletizer cuts the multilayer strand into a specified length by driving a rotary knife, or the like. By cutting the multilayer strand as it is, double columnar form multilayer pellets comprising the core material and the sheath material are obtained.

In general, multilayer pellets with outside diameter of about 2 to 8 mm are manufactured.

It needs to be recognized that absolute separation of the compartmentalized zones is not essential. Even though the materials may be in separate zones, there may be some amount of contaminant in the inner zones and some of the uncontaminated polymer the outer zones. The lack of absolute separation is true for all embodiments of the invention.

Figure 3:
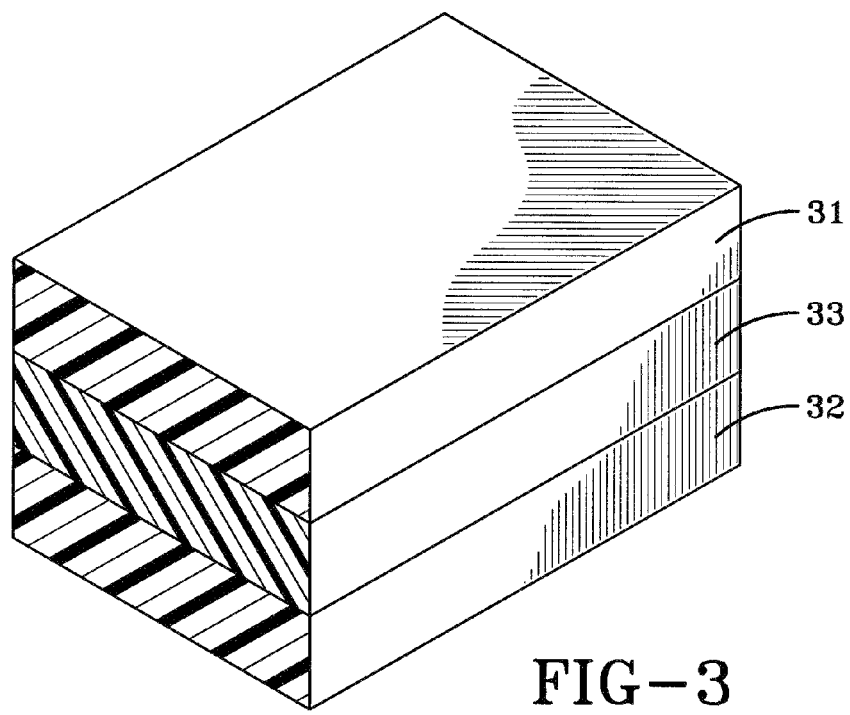
FIG. 3 depicts a resin pellet with three compartments or zones in a multi-layered or sandwich configuration.

The thermoplastic polymers can be cast into layered sheets that are then cut in a cube form as well. The minimum structure is two layers, but the preferred structure for a cast structure of this invention is depicted in FIG. 3. In the sandwich or layered construction there are at least three layers wherein the middle layer, labeled 33, of the clean material is sandwiched between a first outer layer, labeled 31, and a second outer layer, labeled 32, with each outer layer containing the contaminated material. Alternatively, only the outermost layer may contain the contaminated material.

In most extractive processes, the contaminants are removed from the surface of the pellet and then radiate (diffuse) outward from the center of the pellet to the outer wall. It is therefore advantageous to place the material containing the contaminant in the outer wall of the pellet and to place the material without the contaminant, or alternatively substantially lower contaminants in the inner zone, called the core.

A preferred embodiment is the core-sheath design wherein the core comprises low molecular polyester known as feed polymer with an Intrinsic Viscosity (I.V.) preferably ranging from 0.45 to 0.62 dl/g, and the sheath comprises the contaminated polyester, usually postconsumer recycled polyester. Typical I.V.'s of postconsumer recycled PET are in the range of 0.60 to 0.82 dl/g.

Such postconsumer recycled PET, recycled polyester, or recycled polyethylene terephthalate is often derived from used soft drink bottles and is commercially available throughout the world. To be recycled, the material has to have existed as a solid at least once prior to being extruded into the core. A sheath of postconsumer recycled polyester would be of variable composition representative of the thermoplastic polymers used in packages at the time and would therefore contain a mixture of the various packaging polyesters in the market place.

A special type of postconsumer recycled polyester is the type known as FDA regulated postconsumer recycled polyester. The FDA is the United States Food and Drug Administration and is charged with promulgating regulations governing the use of plastics in food packaging. FDA regulated means that the postconsumer recycled polyester complies with the FDA regulations governing the use of the plastic in food and beverage packaging prior to being placed into the compartmentalized chip. To comply with the FDA regulations the resin must be of a suitable purity for use in food packaging as required with the Food Drug and Cosmetic Act as amended and implementing regulations. Some postconsumer recycled polyesters are manufactured using process that have been reviewed by the FDA and the FDA has issued that it judges the material from that process to be of suitable purity in accordance with 21 C.F.R 174.5, provided that it otherwise complies with 21 C.F.R 177.1630. This is often referred to as a "letter of no objection". These postconsumer recycled polyesters are also considered meeting the limitation of being FDA regulated and would be considered FDA regulated postconsumer recycled polyesters. It is important to understand that a regulated recycled postconsumer polyester can meet the requirements and be FDA regulated for the purposes of this specification and not have a "letter of no objection" as to the process used to clean the polyester.

The FDA regulated recycled postconsumer polyester is likely to still have contaminants, therefore even the FDA regulated recycled postconsumer polyester or other FDA regulated recycled plastics will benefit from this invention, so long as they are contaminated.

This pellet structure is then subjected to at least one extraction step to remove the contaminant. Some extraction steps will also raise the molecular weight of the both the contaminated and uncontaminated polymer. Extraction using high temperature and an evacuating vacuum or high temperature and exposure to a vapor stream of a gas inert to the polymer are examples of such extraction steps.

One skilled in the art will recognize that if the extraction process increases the molecular of the polymers, then the location of the polymers in the pellet will influence the rate of I.V. increase. Once the final molecular weight is determined, the person skilled in the art will select a lower starting molecular weight of each respective zone such that the final molecular weight is the desired molecular weight of the polymer in each respective zone.

Suitable thermoplastic polymers for use in the present invention include any thermoplastic homopolymer or copolymer. Examples of oxygen inert thermoplastic polymers are polyethylene terephthalate, polybutylene terephthalate, polytrimethylene terephthalate, and polyethylene naphthalate, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylene-propylene copolymers, poly(1-hexene), poly(4-methyl-1-pentene), poly(1-butene), poly(3-methyl-1-butene), poly(3-phenyl-1-propene) and poly(vinylcyclohexane). Preferably, the thermoplastic polymer used in the present invention comprises a polyester polymer or copolymer such as polyethylene terephthalate or crystallizable copolymer of polyethylene terephthalate.

It will be understood that the thermoplastic polymer suitable for use in the present invention can be made into a film, sheet, or injection molded article.

Polymers employed in the present invention can be prepared by conventional polymerization procedures well known in the art. The polyester polymers and copolymers may be prepared by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. For clarity, a polymer of terephthalate, isophthalate and naphthalate with ethylene glycol, diethylene glycol and cyclohexanedimethanol contains six distinct monomers and is considered a copolymer. The diversity of the repeat units depends on the number of different types of monomers present in the initial polymerization reaction. In the case of polyesters, copolymers include reacting one or more diols with a diacid or multiple diacids, and are sometimes also referred to as terpolymers.

Suitable dicarboxylic acids include those comprising from about 6 to about 40 carbon atoms. Specific dicarboxylic acids include, but are not limited to, terephthalic acid, isophthalic acid, 2,6-naphthalene dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Preferably, the thermoplastic polymers used in the present invention comprise a polyester polymer which means a homopolymer or copolymer such as polyethylene terephthalate or crystallizable copolymer of polyethylene terephthalate. For clarity, the terms crystallizable polyethylene terephthalate, the group consisting of crystallizable polyethylene terephthalates, refers to polymers which are crystallizable and comprised of at least 85% polyethylene terephthalate repeating segments. The remaining 15% may be any other combination of acid-glycol repeating units, provided that the resulting polymer is capable of achieving a degree of crystallinity of at least 5%, more preferably 10%.

The term crystallizable polyester refers to polymer which is crystallizable and at least 85% of its acid moieties are selected from the group consisting of terephthalic acid, 2,6 naphthalene dicarboxylic acid or their respective di-methyl esters.

The terms polyethylene naphthalate, polyethylene terephthalate, PET, RPET, are therefore not restricted to the homopolymer but also refer to the respective copolymers as well.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used.

One preferred polyester is polyethylene terephthalate (PET homopolymer) formed from the approximate 1:1 stoichiometric reaction of terephthalic acid, or its ester, with ethylene glycol. Another preferred polyester is polyethylene naphthalate (PEN homopolymer) formed from the approximate 1:1 to 1:1.6 stoichiometric reaction of naphthalene dicarboxylic acid, or its ester, with ethylene glycol.

Yet another preferred polyester is polybutylene terephthalate (PBT). PET copolymers, PEN copolymers, and PBT copolymers are also preferred. Specific co- and terpolymers of interest are PET with combinations of isophthalic acid or its diester, 2,6 naphthalene dicarboxylic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

Because the desirability of this pellet structure is for food packaging, other suitable polyesters are listed in USA 21 CFR 177.1000-177.2910 (revised April, 1997 edition).

Polytrimethylene terephthalate (PTT) is another preferred polyester. It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The preferred polymer of this invention may also contain small amounts of phosphorous compounds, such as phosphates, and a catalyst such as a cobalt compound, that tends to impart a blue hue. Other agents which may be included are infrared absorbers such as carbon black, graphite, and various iron compounds.

After the melt phase polymerization, the resulting polymer may be placed into the inner compartment (core) with the contaminated polymer in the sheath and the pellet subjected to the extraction process. One such extraction process is the solid phase polymerization process described below.

Alternatively, the melt phase polymerization described above may be made into the traditional pellet, followed by a crystallization step and then a solid phase polymerization (SSP) step to increase the molecular weight, as measured by intrinsic viscosity, necessary for bottle manufacture. The clean or virgin solid phase polymerized polymer could then be extruded into the core of the invention.

The crystallization and polymerization can be performed in a tumbler dryer reaction in a batch-type system. Alternatively, the crystallization and polymerization can be accomplished in a continuous solid phase process whereby the polymer flows from one vessel to another after its predetermined thermal treatment in each vessel.

The crystallization conditions preferably include a temperature of from about 100° C. to about 190° C. The solid phase polymerization conditions preferably include a temperature of from about 200° C. to about 232° C., and more preferably from about 215° C. to about 232° C. The solid phase polymerization may be carried out for a time sufficient to raise the molecular weight to the desired level, which will depend upon the application. For a typical bottle application, the preferred molecular weight corresponds to an intrinsic viscosity from about 0.65 to about 1.0 deciliter/gram, as determined by ASTM D-4603-86 at 30° C. in a 60/40 by weight mixture of phenol and tetrachloroethane. The time required to reach this molecular weight may range from about 8 to about 45 hours.

The other component of this embodiment is a contaminant which can be extracted from the polymer. Contaminants of the invention are those contaminants which can be extracted from the polyester pellet in its solid form. The extraction usually occurs in the presence of temperature (150° C. to 1° C. degrees below the melt point of the pellet) and a driving force at the surface of pellet such as steam distillation, evacuating vacuum, vapor stream, or liquid stream. Examples of contaminants are the various organic flavorants found in foods that migrate into the polymer, household chemicals, low and high boiling point household compounds that may be stored in the container, and even some polymeric materials which may be introduced into the major polymer matrix intentionally or via the recycling process. Glues, poly m-xylylene adipamide (MXD6), and poly-vinyl chloride are examples of such polymers which may extract out from the surface using a liquid extraction. MXD6, for example, is soluble in formic acid.

Removal efficiency can be demonstrated using toluene, methanol, calcium monomethyl arsenate, chloroform, benzophenone, and phenyldecane as surrogates for the contaminants. The comparison is the amount of material introduced in the polymer at the beginning of the process and the amount that is present after the process.

In one embodiment, the pellet can be made by extruding the core of a polymer strand from a prepolymer (0.52 IV) of a polyethylene terephthalate copolymer and extruding a sheath over the core of about 2 to 50 weight percent by weight of the pellet from pieces of washed postconsumer polyester. The strand is then converted to solid core-sheath pellets. Contaminants are then extracted from the pellets by subjecting them to 225° C. and passing nitrogen over the pellets for 16 hours. The extraction time will be the time required to reach the proper intrinsic viscosity or the time required to remove the necessary amount of contaminants. A variation of the extraction process is to use vacuum instead of a nitrogen sweep.

In another embodiment, the recycled postconsumer sheath layer will contain betweem 0.01 and 8 percent by weight of sheath poly-m-xylylene adipamide (nylon MXD6). The pellet is then exposed to 95° C. Formic Acid to extract the nylon from the sheath.

In the above embodiments, it should be apparent that the surface of the contaminated material is greater and the diffusion path shorter than if the contaminant was homogenously dispersed throughout the pellet. Therefore, the efficiency of extractive purification processes are enhanced.

Experimental

The following data demonstrate the improved efficiency of the current invention. Because most contaminants are volatile, they can be extracted by exposing the polymer to heat and a driving force which could be a sweep of inert gas or vacuum. In the experiments, volatile organic colorants were used as surrogates for other contaminants. The improved removal efficiency was determined by measuring color of an article made from the pellets both before and after extraction.

The experiment consisted of the control pellet and the working example compartmentalized pellet. In the first series, the control pellet was made by extruding polyester and adding 110 ppm Solvent Dye 13 (SV-13) to the extruder. The working example used the same polyester in the compartmentalized pellet. 50% of the pellet was the core which was free from any colorant (contamination). The same amount of colorant as was added to the control pellet (110 ppm on the basis of the whole pellet) was added to the polyester in the sheath. Because the pellet was 50% core:50% sheath, the sheath contained 220 ppm, by weight of the sheath, SV-13.

The pellets were crystallized and then blended 3:1 with uncolored PET and injection molded into a preforms, blown into a bottle and the Hunter L*, a*, b* measured. The closeness of the numbers, in particular the L* indicate the materials started with the same amount of colorant.

The remaining pellets were then subjected to high temperature in the presence of a nitrogen sweep for 10 hours. After 10 hours, the pellets were removed, injection molded into the same preform shape as the initial pellets and the color measured again.

As shown in Table I, the higher L* and lower b* of bottle sidewall blown from the preform made with the compartmentalized pellet demonstrate that more of the volatiles were removed from the compartmentalized pellet than the control blended pellet. This confirms the observation that more colorant was on top of the vessel lid after the extraction of the compartmentalized pellet than was present after the extraction of the blended pellet.

Delta E is the square root of the sum of the squares of each value from its neutral color which is 100, 0, 0 for the L*, a*, b* color space and is equal to:

$SQRT((100-L^*)^{2+} (a^*)^2, +(b^*)^2)$, where SQRT is the square root function of the number in the parenthesis.

TABLE I

EXPERIMENTAL RESULTS

|  | Control Blend | Compartmentalized Pellet |
|---|---|---|
| Color before Extraction, blended 1:3 with uncolored PET | | |
| L* | 84.3 | 85.0 |
| a* | 1.2 | 1.0 |
| b* | −6.9 | −5.9 |
| Delta E | 10.4 | 9.1 |
| Color After Extraction, unblended | | |
| L* | 69.8 | 72.5 |
| a* | 4.9 | 3.6 |
| b* | −21.7 | −17.2 |
| Delta E | 31.4 | 26.0 |

We claim:

1. A method of purifying postconsumer polyester comprising:

cleaning comminuted pieces of postconsumer polyester to remove surface contaminants therefrom thereby producing surface cleaned postconsumer polyester pieces;

melting the surface-cleaned postconsumer polyester pieces to produce a postconsumer polyester melt;

extruding the postconsumer polyester melt to reduce the intrinsic viscosity of the postconsumer polyester melt;

forming a compartmentalized strand comprised of at least an outer compartment and an inner compartment wherein the outer compartment is next to air and is comprised of the postconsumer polyester melt and the inner compartment is comprised of a virgin polyester melt;

solidifying and pelletizing the compartmentalized strand to make solid compartmentalized pellets; and extracting contaminants from the solid compartmentalized pellets.

2. The process of claim 1, wherein the postconsumer polyester is less than 35 weight percent of the compartmentalized pellet.

3. The process of claim 2 wherein the extraction step comprises maintaining the compartmentalized pellets in a temperature range of 150° C. and 5° C. less than the melt point of the pellet and removing the contaminants from the surface of the pellet.

4. The process of claim 3, wherein the step of removing the contaminants from the surface comprises passing a vapor over the pellets.

5. The process of claim 4, wherein the vapor is non-reactive to the postconsumer polyester in the compartmentalized pellet.

6. The process of claim 5, wherein the vapor is an inert gas, or mixture of inert gases.

7. The process of claim 2, wherein the extraction step comprises exposing the compartmentalized pellets to a liquid which removes at least one contaminant.

8. The process of claim 7, wherein polyamide is soluble in the liquid.

9. The process of claim 8, the liquid is formic acid or ethylene glycol.

* * * * *